United States Patent
Rohee et al.

(10) Patent No.: US 6,325,458 B1
(45) Date of Patent: *Dec. 4, 2001

(54) PIVOT MECHANISM FOR A VEHICLE SEAT AND SEAT FITTED WITH SAID MECHANISM

(75) Inventors: René Rohee, La Chapelle Biche; François Cillierre, La Selle la Forge, both of (FR)

(73) Assignee: Betrand Faure Equipements, Boulogne (FR)

(*) Notice: Subject to any disclaimer, the term of this patent is extended or adjusted under 35 U.S.C. 154(b) by 0 days.

This patent is subject to a terminal disclaimer.

(21) Appl. No.: 09/501,248

(22) Filed: Feb. 10, 2000

(30) Foreign Application Priority Data

Feb. 25, 1999 (FR) .................................................. 99 02349

(51) Int. Cl.[7] ...................................................... B60N 2/22
(52) U.S. Cl. ............................................................ 297/367
(58) Field of Search .................................. 297/367, 366, 297/216.13, 216.14, 216.15, 216.16

(56) References Cited

U.S. PATENT DOCUMENTS

| 5,590,931 | * | 1/1997 | Fourrey et al. | 297/367 X |
| 5,611,599 | * | 3/1997 | Baloche et al. | 297/367 |
| 5,681,086 | | 10/1997 | Baloche | 297/367 |
| 5,755,491 | * | 5/1998 | Baloche et al. | 297/367 X |
| 5,769,494 | * | 6/1998 | Barerre et al. | 297/367 |
| 5,788,325 | | 8/1998 | Ganot | 297/216.14 |
| 5,857,746 | * | 1/1999 | Barerre et al. | 297/367 |
| 5,873,630 | * | 2/1999 | Yoshida et al. | 297/367 |
| 5,881,854 | * | 3/1999 | Rougnon-Glasson | 297/367 X |
| 6,007,153 | * | 12/1999 | Benoit et al. | 297/367 X |
| 6,085,386 | * | 7/2000 | Blanchard et al. | 297/367 X |
| 6,092,874 | * | 7/2000 | Kojima et al. | 297/367 |
| 6,095,608 | * | 8/2000 | Ganot et al. | 297/367 |
| 6,102,480 | * | 8/2000 | Asano | 297/367 X |
| 6,112,370 | * | 9/2000 | Blanchard et al. | 297/367 X |

FOREIGN PATENT DOCUMENTS

| 0 720 930 | 7/1996 | (EP) . |
| 0 788 923 | 8/1997 | (EP) . |
| 0 878345 | 11/1998 | (EP) . |

OTHER PUBLICATIONS

French Preliminary Search Report, Nov. 9, 1999, Appl. No. FR 9902349.

* cited by examiner

Primary Examiner—Peter M. Cuomo
Assistant Examiner—Rodney B. White
(74) Attorney, Agent, or Firm—Marshall, Gerstein, & Borun

(57) ABSTRACT

A pivot mechanism comprising first and second frames linked so as to pivot, in which locking members may co-operate with teeth on one of the frames in order to lock the mechanism, and at least one stop member which is joined to the second frame and which is arranged so that the locking member abuts at an angle against said stop member if the pivot mechanism is subjected to a pivot torque in a first direction of rotation whilst the locking member is in its locked position: if this torque exceeds a threshold value, the stop member is displaced towards the over-locking member and pushes it against the teeth of the frame in order to lock it.

9 Claims, 3 Drawing Sheets

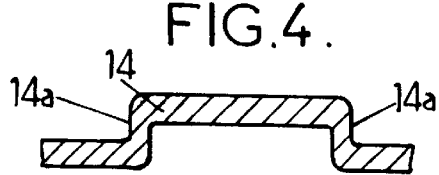
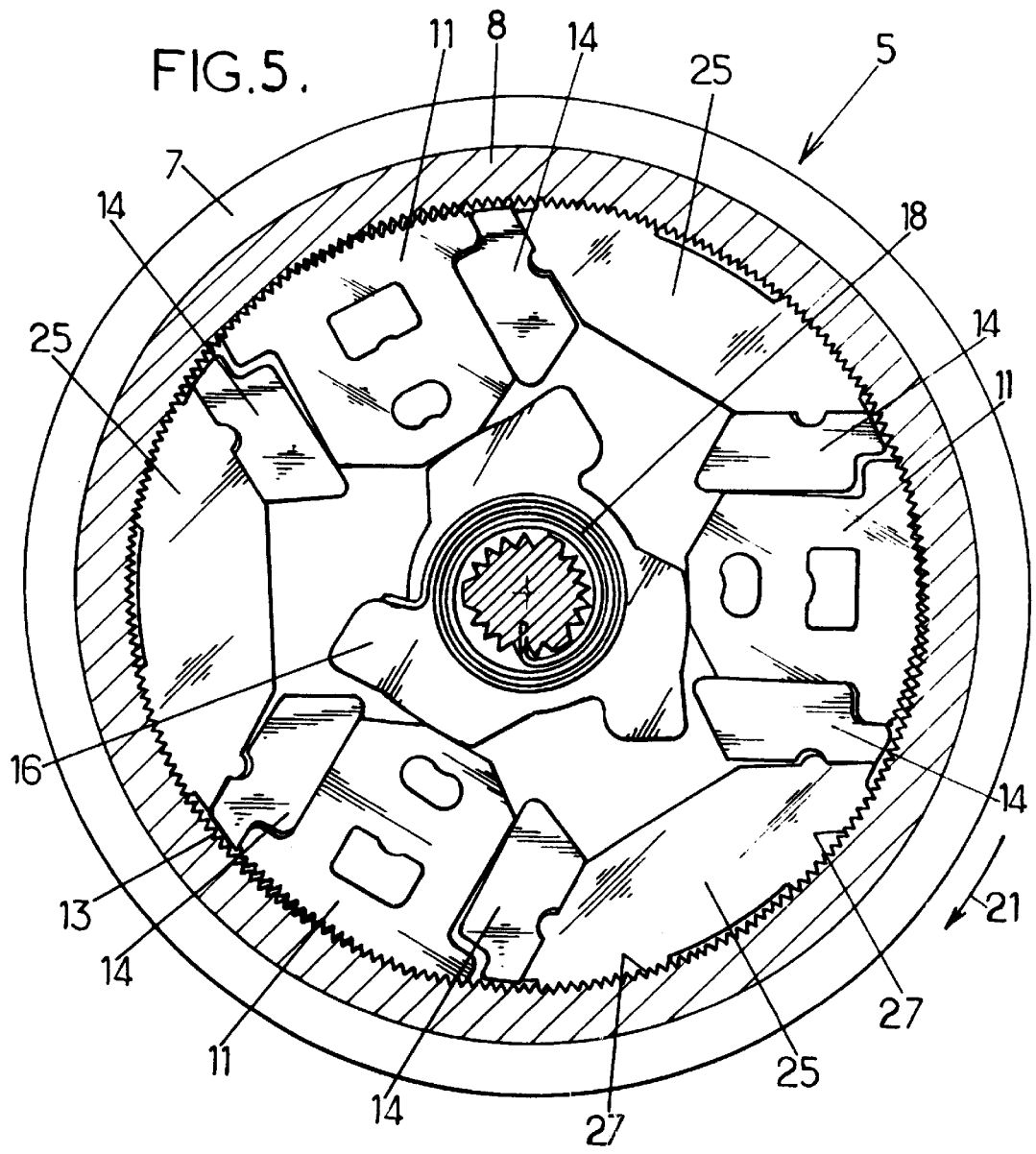

PIVOT MECHANISM FOR A VEHICLE SEAT AND SEAT FITTED WITH SAID MECHANISM

FIELD OF THE INVENTION

The present invention relates to the pivot mechanisms used with vehicle seats and seats fitted with these mechanisms.

More specifically, the invention relates to a pivot mechanism comprising:

- first and second rigid frames mounted so as to pivot relative to one another about an axis of rotation,
- teeth joined to the first frame and forming at least one circular arc centered on the axis of rotation,
- at least one rigid locking member which is movable relative to the second frame between a locking position on the one hand, in which it co-operates with the teeth of the first frame in order to immobilize the first and second frames relative to one another, and, on the other hand, retracted position in which said locking member does not mesh with the teeth of the first frame,
- control means designed to place the locking member selectively either in its locked position or in its retracted position,
- and at least one rigid stop member which is joined to the second frame and positioned so that the locking member abuts at an angle against said stop member if the pivot mechanism is subjected to a pivot torque in a first direction of rotation whilst the locking member is in its locked position.

BACKGROUND OF THE INVENTION

Document EP-A-0 720 930 describes an example of a pivot mechanism of this type, which is totally satisfactory.

OBJECTS AND SUMMARY OF THE INVENTION

However, in view of the way in which safety standards are changing, it would be of interest to make the type of pivot mechanisms described above stronger in order to prevent these mechanisms from breaking in the event of an accident, in which case the pivot mechanisms would be subjected to a particularly high rotation torque.

To this end, the invention proposes a pivot mechanism of the type in question, which also has at least one rigid over-locking member which is movable relative to the second frame between an active position on the one hand, in which it co-operates with the teeth of the first frame so as to immobilize the first and second frames relative to one another, and a retracted position on the other hand, in which said over-locking member does not mesh with the teeth of the first frame, this over-locking member normally being maintained in its retracted position by retaining means designed to give way if the over-locking member is pushed with sufficient force into its active position, and wherein the stop member is designed to be displaced towards the over-locking member and to push said member into its active position by camming action if the pivot mechanism is subjected to a torque higher than a predetermined value in the first direction of rotation.

As a result of these features, the pivot mechanism is considerably stronger in the event of impact without at the same time requiring more complicated control means since the normal control of the locking member does not act on the over-locking member.

In preferred embodiments of the invention, one and/or the other of the following features may be incorporated:

- the stop member is designed to be plastically deformed if the pivot mechanism is subjected to a rotation torque greater than said first predetermined value: this plastic deformation allows some of the mechanical energy of the impact to be absorbed in the event of an accident, which attenuates the effects of the impact felt by the passenger occupying the seat;

The locking mechanism also has

- at least one additional over-locking member which is able to move relative to the second frame between an active position on the one hand, in which said additional over-locking member co-operates with the teeth of the first frame in order to immobilize the first and second frames relative to one another, and a retracted position on the other hand, in which said additional over-locking member does not mesh with the teeth of the first frame, this additional over-locking member normally being maintained in its retracted position by retaining means designed to give way if the additional over-locking member is pushed into its active position with sufficient force,
- and at least one additional rigid stop member joined to the second frame which is positioned so that the locking member abuts at an angle against said additional stop member if the pivot mechanism is subjected to a pivot torque in a second direction of rotation opposite the first direction whilst the locking member is in its locked position, the additional stop member being designed to be displaced towards the additional over-locking member and to push this additional over-locking member into its active position by camming action if the pivot mechanism is subjected to a pivot torque greater than a second predetermined value in the second direction of rotation;
- the additional stop member is designed so that it is plastically deformed if the pivot mechanism is subjected to a rotation torque greater than said second predetermined value;
- the first and second predetermined values for the rotation torque range between 50 and 200 mdaN;
- the teeth of the first frame form a full circle and the pivot mechanism has:
  - a number n, ranging between 3 and 6, of locking members activated by the control means,
  - n over-locking members, distributed at an angle between the locking members and the over-locking members,
  - and 2n stop members distributed at an angle between each locking member and an over-locking member, the locking members being mounted so as to slide radially between the stop members and the over-locking members having pointed ends with an acute angle which are delimited between a front face on the one hand, having teeth designed to mesh in the teeth of the first frame, and a side face on the other hand, arranged in contact with one of the stop members;
  - the teeth of the first frame are directed radially towards the interior, the locking members, the over-locking members and the stop members being arranged to the interior of said teeth
  - the retaining means have bosses and matching indentations, some of which belong to each side face of each locking member whilst the others belong to the corresponding stop members, these bosses and indentations co-operating normally in a reciprocal nesting action so that the over-locking member is normally retained in its retracted position.

The invention also relates to a vehicle seat comprising a backrest which is pivotally mounted on a seat by means of a pivot mechanism of the type defined above.

BRIEF DESCRIPTION OF THE DRAWINGS

Other features and advantages of the invention will become clear from the description below of two embodiments, given by way of example and not restrictive in any respect, and with reference to the appended drawings.

Of the drawings:

FIG. 4 shows a detail, in section along the line IV—IV of FIG. 3, FIG. 5 is a view similar to that of FIG. 3, showing the pivot mechanism after the vehicle in which the seat is fitted has been involved in an accident.

MORE DETAILED DESCRIPTION

The same references are used in the different drawings to denote the same or similar components.

Figure 1:
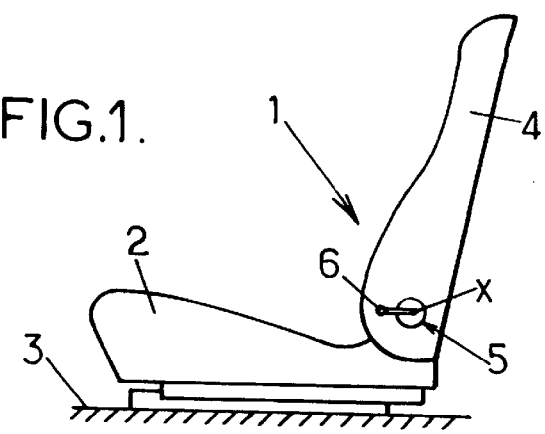
FIG. 1 is a schematic view of a vehicle seat comprising a pivot mechanism as proposed by the invention.

As schematically illustrated in FIG. 1, the invention relates to a vehicle seat 1, in particular a front seat of a motor vehicle, which comprises:

on the one hand a seat part 2 mounted on the floor 3 of the vehicle, and, on the other hand, a backrest 4 mounted on the seat 2 so as to pivot about a horizontal transverse axis X by means of a pivot mechanism 5 controlled by a control lever 6 or similar.

Figure 3:
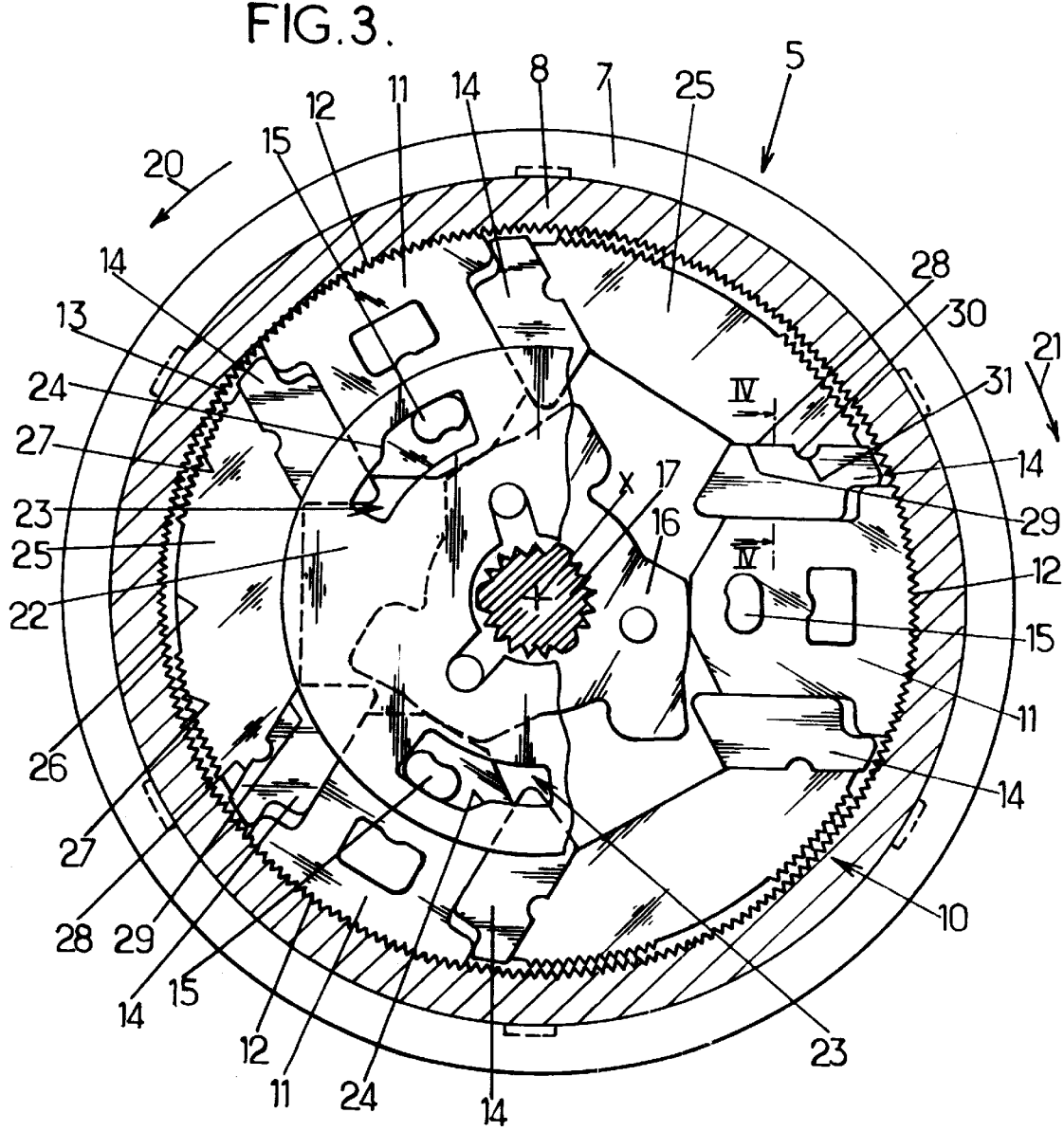
FIG. 3 is a view in section along the broken line III—III of FIG. 2.
Figure 2:
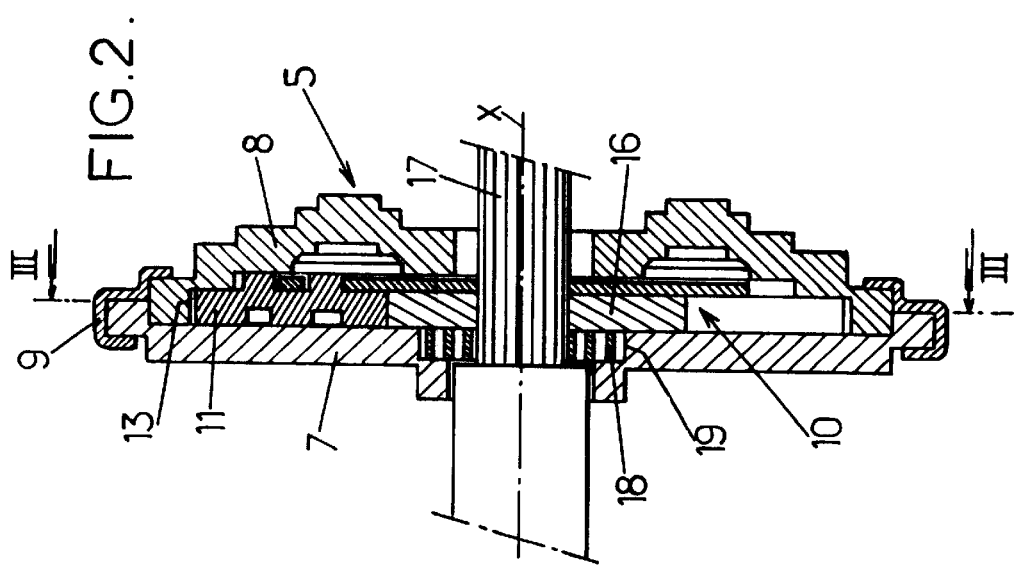
FIG. 2 is a view in axial section of a first embodiment of the pivot mechanism fitted to the seat illustrated in FIG. 1.

As illustrated in FIGS. 2 and 3, the pivot mechanism 5 comprises:

a metal flange 7 which in this case is stationary and joined to the rigid frame of the seat part, a metal flange 8 which in this case is movable and joined to the frame of the backrest, a metal crown 9 which is crimped around the periphery of the stationary and mobile flanges, delimiting therewith a closed circular housing, and a locking device 10 which is contained in this housing and which is designed to immobilize the mobile flange 8 relative to the stationary flange 7 provided the lever 6 is not operated.

In a manner known per se, this locking device may comprise, for example:

at least one and preferably three metal plates or locking members 11 (more generally, there might be a number n of plates 11, where n is between 1 and 6 and preferably between 3 and 6), which are arranged at 120°. relative to one another and each of which has external teeth 12 designed to mesh with a ring of internal teeth 13 provided in the mobile flange 8, each of these plates being mounted so as to slide radially in a guide formed by two stop members 14 which frame the plate 11 in the circumferential direction and which are joined to the stationary flange 7, the plates 11 thus being displaceable between a locking position on the one hand, in which the teeth 12 of these plates mesh with the teeth 13 of the mobile flange so as to block the pivot mechanism, and a retracted position on the other hand, in which the plates do not co-operate with the teeth of the mobile flange, each plate also having at least one pin 15 projecting out axially towards the mobile flange 8, a metal cam 16 which is joined to a control shaft 17 which is in turn joined to the lever 6, this cam controlling the sliding action of the plates 11, a spring 18 which is mounted, for example, in a shaped indentation 19 provided in the stationary flange 7 and which biases the control shaft 17 and the cam 16 in the angular direction 20 towards a rest position in which said cam places the plates 11 in their locking position, said cam being able to pivot in the opposite angular direction 21 under the action of the control lever 6, enabling the plates to slide towards their retracted position, thereby releasing the pivot mechanism, and a rigid metal plate 22 which is joined to the cam 16 in rotation and which extends radially between said cam and the mobile flange 8 partially covering the plates 11, this plate having three cut-out sections 23 in which the pin 15 of the plates engage, each of these pins co-operating with a cam edge 24 delimiting the corresponding cut-out section radially towards the exterior and which is of a matching shape so as to displace the corresponding plate radially towards the interior when the cam rotates in the direction 21.

In addition, in accordance with the invention, the pivot mechanism also has at least one and preferably three over-locking members 25 (more generally, there is preferably the same number n of over-locking members as there are plates 11), each of which is provided in the form of a rigid metal plate, punched out from a sheet, for example.

These over-locking members are distributed at an angle of 120 degrees relative to one another between the plates 11 and each is housed between two successive stop members 14.

They each have a front face 26 of a circular arc shape, the two ends thereof being provided with teeth 27 designed to mesh with the teeth 13 of the mobile flange in order to strengthen the locking action of the pivot mechanism.

In conjunction with the corresponding side face 28 of said over-locking member, each of the two ends of the front face 26 of the over-locking member 25 forms a point having an acute angle. Each of the side faces 28 of the over-locking member is preferably straight, as seen in a plan view, and is arranged abutting against a matching surface 29 of the corresponding stop member 14.

Furthermore, in order to retain the over-locking member 25 in a retracted position in which its teeth 27 do not co-operate with the teeth 13 of the mobile flange, the side faces 28 of each over-locking member 25 advantageously have at least one boss 30 which nests in a matching indentation 31 of the corresponding stop member 14 (optionally, the boss 30 could be provided on the stop member 14 and the indentation 31 in the side face 28 of the over-locking member 25).

The pivot mechanism described above operates as follows.

If the passenger in the seat 1 wants to adjust the inclination of the backrest 4, he operates the lever 6, causing it to rotate in the angular direction 21, which releases the pivot mechanism 5 enabling the passenger to adjust the inclination of the backrest 4 by acting directly on this backrest, for example by pushing backwards with his back or, vice versa, by letting it move forward under the action of one or more springs inside his backrest (not illustrated).

On the other hand, if the passenger is not operating the lever 6, the pivot mechanism will remain in a locked position.

If the vehicle is involved in an accident whilst the pivot mechanism is in this locked position, the mobile flange 7 of the pivot mechanism may, depending on the circumstances, be subjected to a very high torque in one or other of the angular directions 20, 21, in this case direction 21 in the example illustrated in FIG. 5.

This torque may be due, for example, to:

the inertia of the passenger in the case of rear impact or if the safety belt has a top anchoring point joined to the backrest, and/or the impact of luggage located to the rear of the seat in the event of a frontal impact.

If the torque reaches a certain threshold value, for example 100 or 150 mdaN (decametres Newton) or more generally a threshold value between 50 and 200 mdaN, the plates 11 are subjected to very high forces in the circumferential direction so that each of these plates causes the stop member 14 located downstream in the direction in which the force is applied to be plastically deformed, in this case direction 21: one stop member 25 in two is therefore displaced in the direction 21 towards the corresponding over-locking member 25.

Under the effect of this plastic deformation, most keenly felt by the relatively narrow bridges of material 14a linking the stop members 14 to the stationary flange 7, if these members 14 are made by a stamping process with said flange 7 (see FIG. 4), each over-locking member 25 is displaced radially towards the exterior by the stop members 14, under the action of the cam or pointed end.

As the over-locking members 25 move in this manner, the bosses 30 normally retaining the members 25 in the retracted position are crushed and/or the corresponding indentations 31 become wider and the over-locking members 25 shift into the active position illustrated in FIG. 5 in which their teeth 27 co-operate with the teeth 13 of the mobile flange 8 so as to assist in immobilising this flange.

Once the over-locking members 25 are in the active position, they form, in conjunction with the stop members 14 and the plates 11, a continuous circular chain of rigid members meshing with the teeth 13 of the mobile flange over a major part of its periphery, which therefore exhibits greater resistance to the torques acting on the mobile flange.

The pivot mechanism is therefore able to withstand torques in excess of 300 mdaN for a modest additional cost as compared with a conventional mechanism of the prior art.

It should also be pointed out that the plastic deformation of the stop members 14 enables a not inconsiderable amount of the mechanical energy induced by the impact on the vehicle to be absorbed, which helps to absorb the impact experienced by the passenger occupying the seat.

The pivot mechanism would operate in the same way if the torque were applied to the mobile flange 7 in the direction 20.

It should be pointed out that the over-locking plates 25 retain their final position after the vehicle has been subjected to an accident: if the impact were high, the over-locking plates 25 would then hold the backrest locked in position. These plates 25 are therefore evidence of the amount of damage sustained by the seat and hence an indication to the user and/or service personnel that the seat needs to be replaced in order to guarantee the safety of the passenger.

Figure 6:
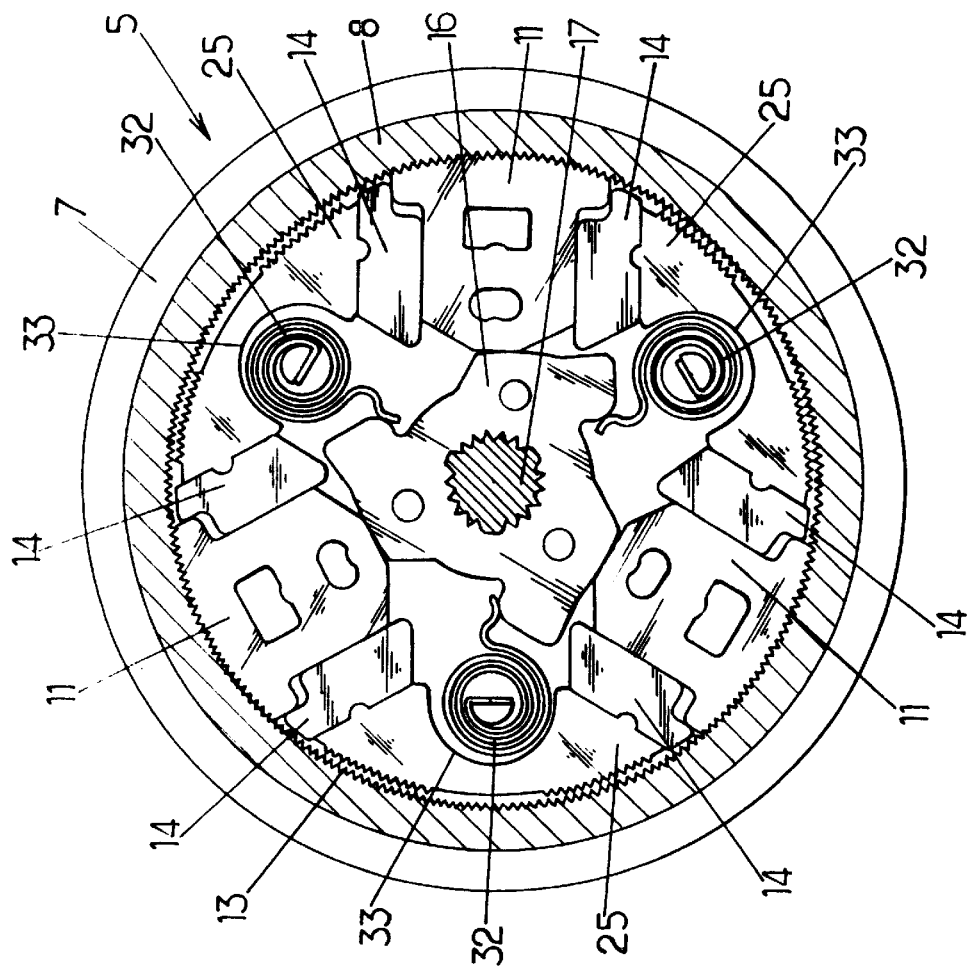
FIG. 6 is a view similar to that of FIG. 3, showing a second embodiment of the pivot mechanism proposed by the invention.

Clearly, the invention is not limited to the example of an embodiment described above; on the contrary, it includes all possible variants, in particular those in which:

the pivot mechanism might be used to control an adjustment to the seat other than the inclination of the backrest (for example the height adjustment of the seat part or another adjustment), those in which the spring 18 is arranged inside the housing formed by the flanges 7, 8 and the crimped crown 9, those in which the spring 18 is replaced by one or more springs 32 acting directly on the cam 16, it being possible for these springs 32 to be housed in recesses 33, for example, provided to the rear of the over-locking members 25, as illustrated in FIG. 6 (the other elements already described are exactly the same or similar in the embodiment illustrated in FIG. 6, which will therefore not be described in detail), those in which each over-locking plate 25 has one side face 29 arranged as described above and one side face co-operating with a stationary stop member, by meshing, belonging to the stationary flange 7 so that the over-locking plate pivots when it shifts from its retracted position to its active position, those in which what is referred to as the mobile flange is joined to circular teeth directed radially towards the exterior, in which case the locking plates 11 and the over-locking plates 25 will be arranged around these teeth and will have teeth pointing radially towards the interior, and those in which the locking plates pivot between their locking position and retracted position, these plates co-operating as above with stop members by deforming them if the vehicle is subjected to a violent impact so as to drive the over-locking members into their active position.

We claim:

1. A pivot mechanism comprising:

first and second rigid frames mounted so as to pivot relative to one another about an axis of rotation, teeth joined to the first frame and forming at least one circular arc centered on the axis of rotation, at least one rigid locking member which is movable relative to the second frame between a locking position in which it co-operates with the teeth of the first frame in order to immobilize the first and second frame relative to one another, and a retracted position in which said locking member does not mesh with the teeth of the first frame, control means designed to place the locking member selectively either in its locked position or in its retracted position, and at least one rigid stop member which is joined to the second frame and which is arranged so that the locking member abuts at an angle against said stop member if the pivot mechanism is subjected to a pivot torque in a first direction of rotation while the locking member is in its locked position, said pivot mechanism also having at least one rigid over-locking member which is movable relative to the second frame between an active position in which it co-operates with the teeth of the first frame to immobilize the first and second frames are relative to one another, and a retracted position in which said over-locking member does not mesh with the teeth of the first frame, this over-locking member normally being retained in its retracted position by retaining means designed to give way if the over-locking member is pushed towards its active position with sufficient force, and wherein the stop member is designed to be displaced toward the over-locking member and to push said over-locking member into its active position by camming action if the pivot mechanism is subjected to a torque greater than a first predetermined value in the first direction of rotation.

2. A pivot mechanism as claimed in claim 1, in which the stop member is designed to undergo plastic deformation if the pivot mechanism is subjected to a rotation torque greater than said first predetermined value.

3. A pivot mechanism as claimed in claim 1, additionally comprising:

at least one additional rigid over-locking member which is movable relative to the second frame between an active position in which said additional over-locking member co-operates with the teeth at the first frame in order to immobilize the first and second frames relative to one another, and a retracted position in which said additional over-locking member does not mesh with the teeth of the first frame, this additional over-locking mechanism normally being retained in its retracted position by retaining means designed to give way if the additional over-locking member is pushed to its active position with sufficient force, and at least one additional rigid stop member which is joined to the second frame and which is arranged so that the locking member abuts at an angle against said additional stop member if the pivot mechanism is subjected to a pivot torque in a second direction of rotation opposite the first direction while the locking member is in its locked position, the additional stop member being designed to be displaced toward the additional over-locking member and to push said additional over-locking member into its active position by camming action if the pivot mechanism is subjected to a pivot torque greater than a second predetermined value in the second direction of rotation.

4. A pivot mechanism as claimed in claim 3, in which the additional stop member is designed to be plastically deformed if the pivot mechanism is subjected to a rotation torque greater than said second predetermined value.

5. A pivot mechanism as claimed in claim 3, in which the first and second predetermined values of the rotation torque are between 50 and 200 mdaN.

6. A pivot mechanism as claimed in claim 1, in which the teeth of the first frame form a full circle and the pivot mechanism comprises:

a number n, ranging between 3 and 6, of locking members operated by control means, n over-locking members, distributed at an angle between the locking members, and 2n stop members distributed at an angle between the locking members and the over-locking members, the locking members being mounted so as to slide radially between the stop members, and the over-locking members having pointed ends with an acute angle which are delimited between a front face provided with teeth designed to mesh with the teeth of the first frame, and a side face arranged in contact with one of the stop members.

7. A pivot mechanism as claimed in claim 6, in which the teeth of the first frame are directed radially towards the interior, the locking members, the over-locking members and the stop members being arranged to the interior of said teeth.

8. A pivot mechanism as claimed in claim 1, in which the retaining means have matching bosses and indentations some of which belong to each side face of each locking member and the others of which belong to the corresponding stop members, these bosses and indentations co-operating by a reciprocal nesting action so that the over-locking member is normally retained in its retracted position.

9. A vehicle seat comprising a backrest mounted so as to pivot on a seat part by means of at last one pivot mechanism as claimed in claim 1.

* * * * *